Figure 1:
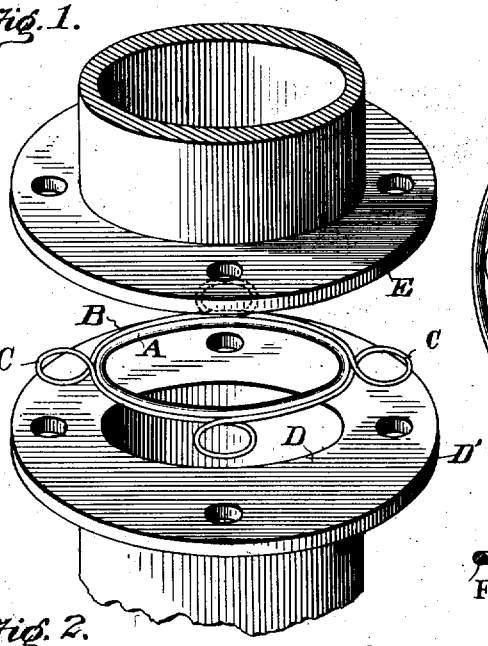

No. 11,858. Reissued Sept. 25, 1900.

C. H. MERWARTH.

GASKET OR PACKING.

(Application filed May 5, 1900.)

2 Sheets—Sheet 1.

Witnesses:
Fenton S. Pelt
Henry C. Hazard

Inventor:
Charles H. Merwarth
by Prindle and Russell
his Attorneys

No. 11,858. Reissued Sept. 25, 1900.

C. H. MERWARTH.

GASKET OR PACKING.

(Application filed May 5, 1900.)

2 Sheets—Sheet 2.

Witnesses:
Fenton S. Pelt,
Henry C. Hazard.

Inventor:
Charles H. Merwarth
by Prindle and Russell
his Attorneys

UNITED STATES PATENT OFFICE.

CHARLES HOWARD MERWARTH, OF SOUTH BETHLEHEM, PENNSYLVANIA, ASSIGNOR TO THE MERWARTH METALLIC GASKET COMPANY, OF SAME PLACE.

GASKET OR PACKING.

SPECIFICATION forming part of Reissued Letters Patent No. 11,858, dated September 25, 1900.

Original No. 605,891, dated June 21, 1898. Application for reissue filed May 5, 1900. Serial No. 15,657.

*To all whom it may concern:*

Be it known that I, CHARLES HOWARD MERWARTH, of South Bethlehem, in the county of Northampton, State of Pennsylvania, have invented certain new and useful Improvements in Gaskets or Packing, for which Letters Patent No. 605,891 were issued upon the 21st day of June, 1898, which Letters Patent have been found to be inoperative and invalid and not to cover fully the invention set forth in the specification and shown in the drawings which were filed by me in the Patent Office upon the 4th day of January, 1898, preparatory to the obtaining of the said Letters Patent. Now, therefore, being desirous of reissuing the said Letters Patent, I have prepared and do hereby declare the following to be a full, clear, and exact description of the said improvements, reference being had to the accompanying drawings, in which—

Figure 3:
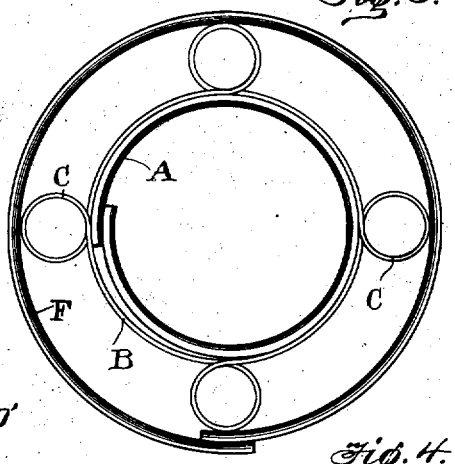
Figure 4:
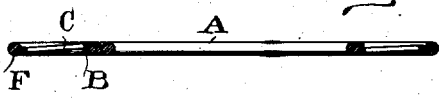
Figure 2:
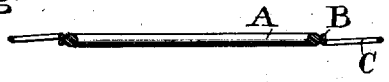
Figure 7:
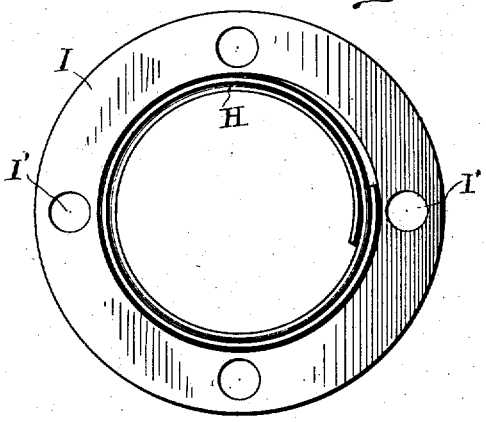
Figure 5:
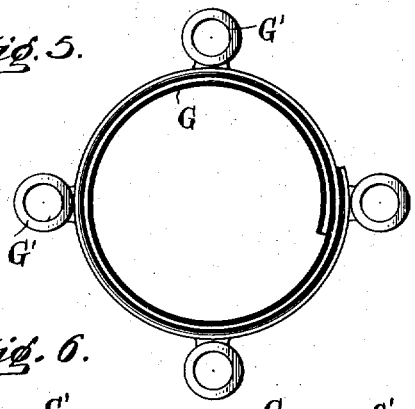
Figure 6:
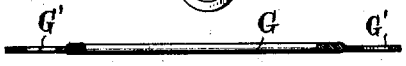
Figure 8:
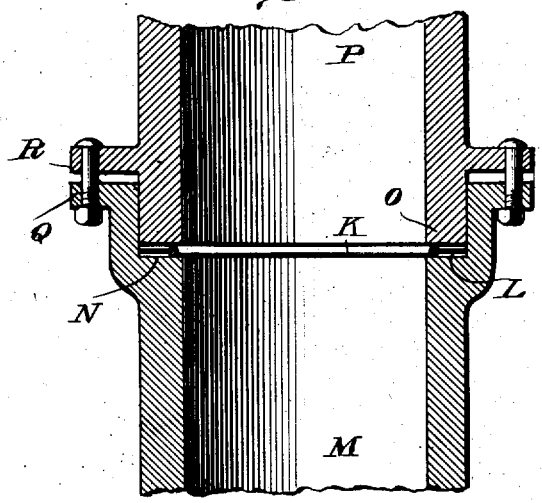
Figure 9:
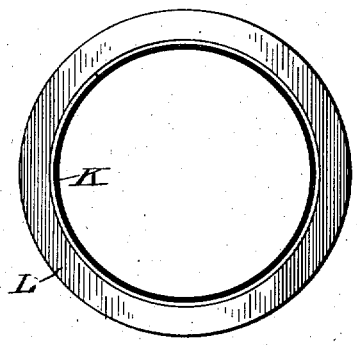
Figure 10:
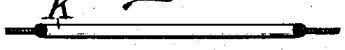
Figure 11:
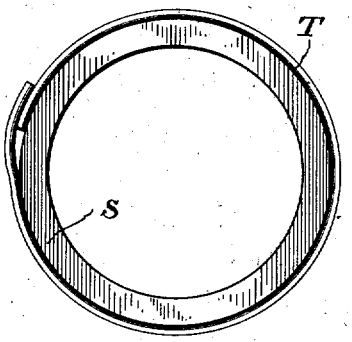
Figure 12:
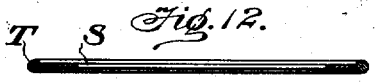
Figure 13:
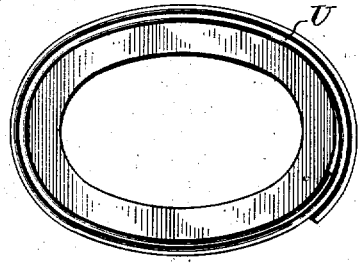
Figure 14:
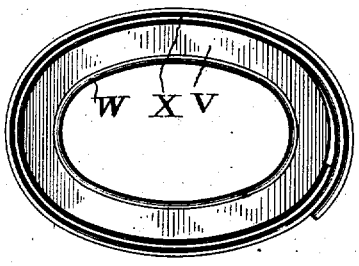

Figure 1 is a perspective view of two flanged pipe ends having between them a gasket embodying my invention, the parts being separated to more clearly show the construction. Fig. 2 is a sectional view of the gasket shown in Fig. 1. Figs. 3 and 4 are a plan and a sectional view, respectively, of another embodiment of my invention. Figs. 5 and 6 are respectively like views of another embodiment of my invention. Fig. 7 illustrates another embodiment of my invention. Fig. 8 is a longitudinal sectional view of a flanged socketed joint having another embodiment of my invention applied thereto. Figs. 9 and 10 are a plan and a sectional view, respectively, of the gasket shown in Fig. 8. Figs. 11 and 12 are respectively like views of another embodiment of my invention. Fig. 13 is a plan view of another embodiment of my invention, and Fig. 14 is a like view of another embodiment of my invention.

Letters of like name and kind refer to like parts in each of the figures.

The objects of my invention are to provide a gasket or packing for the joints of pipes and other apparatus for containing or conveying fluids or liquids—such as steam, oil, gas, &c.—whether under pressure or not, which gasket or packing shall have the qualities of being cheap and simple, of effectively sealing the joint to which it is applied from all leakage, of being accurately and effectively centered on the pipe-joint, and of being easily removed, leaving the surfaces of the joint perfectly clean; and to such ends my invention consists in the gasket or packing hereinafter specified.

In carrying my invention into practice I employ, as shown in Figs. 1 and 2, an inner ring A, an outer ring B, and centering-eyes C. These rings are preferably formed of wire, which, as shown, is circular in cross-section, the inner one, A, being formed of copper or other soft metal and being preferably of larger wire than the outer ring B. The outer ring is composed of harder metal than the inner one and is preferably formed from wire of a smaller size than the inner ring. The wire of the outer ring has sufficient length so that eyes C can be formed at intervals. The rings A and B are secured together. The operation of this form of my gasket is as follows: The gasket, which has an internal diameter slightly greater than the interior diameter of the pipe to which it is to be applied, is placed on the end of the pipe-section D, and its eyes C are engaged by the bolts which are used to secure the pipe-flanges D′ and E together, thus making the gasket concentric with the pipe, so that the inner ring is at all points of its under surface in contact with the pipe end, thus insuring a sealing of the joint at all points around the circle of the gasket. The flanges D′ and E are drawn together by tightening the nuts on the bolts, and they first bear upon the inner or soft-metal ring A and compress it, causing it to take the impressions of the surfaces of such flanges, which surfaces are usually rough, and to fill up all inequalities in such surfaces where they bear on the said ring. The flanges may be made to flatten the metal of the inner ring without compressing it far enough to touch the outer ring, or, if desired, the compression of the inner ring may be carried to an extent which will result in the outer ring being brought into contact. In the latter case, owing both to the great amount of metal that comes into action and to the harder material of the outer ring, the gasket has sufficient strength to cause the flanges D′ and E to assume a position in which they are parallel, if they are not already so, and to bear equally on all parts of the soft ring. The outer ring sustains the soft ring against any pressure which might tend to distort or rupture it, and thus result in imperfectly forming or breaking the seal and permit leakage. My gasket being made entirely of metal does not adhere to the pipe ends, as does rubber or other elastic material, and when removed leaves a clean surface.

In the form of gasket illustrated in Figs. 3 and 4, which is intended for use with such a pipe-joint as is shown in Fig. 1, I have provided, as in the gasket shown in Figs. 1 and 2, an inner soft-metal packing-ring A, surrounded by a holder or retaining-ring B, having one or more eyes C and C, that are formed of the wire of the ring B, and in addition thereto I provide a second soft-metal packing-ring F, which surrounds and is attached to the eyes C and C. This construction provides a double packing for the joint, a packing near the opening in the pipe, and a packing near the outer peripheries of the flanges. The packing-rings A and F are preferably of larger wire than the holding or retaining ring B. The eyes C and C are preferably of smaller wire than the packing-rings A and F; but, if desired, they can be made of the same size wire as said rings A and F and of soft metal, so that the bolt-holes will be sealed by the compression of such eyes between the pipe ends.

In the embodiment of my invention illustrated in Figs. 5 and 6 there is shown a packing-ring G, which consists of a single soft-metal ring, of two such rings placed one inside the other, or of, as shown, a coil of soft-metal wire. To the outer periphery of the packing-ring are attached, as by soldering, a series of eyes G′ and G′, which by engagement with the bolts of the pipe-joint properly center the gasket, the eyes being formed of sheet metal and being thin enough to permit the packing-ring to be properly compressed by the pipe ends.

The gasket illustrated in Fig. 7 consists of an inner soft-metal packing-ring H (shown as formed in the manner described in connection with Figs. 5 and 6) and an outer holding or retaining ring I, which is formed of sheet metal of less thickness than the packing-ring, the ring I having openings I′ formed therein for the reception of the bolts of a joint, such as is shown in Fig. 1, thus causing the gasket to be properly centered. The ring I also performs the functions described in connection with the holding and retaining ring B of the gasket in Fig. 1—namely, of retaining the packing-ring against pressure tending to distort or rupture it.

The gasket shown in Figs. 8, 9, and 10 consists of a soft-metal packing-ring K, secured within a larger sheet-metal retaining and centering ring L, the soft-metal ring K being thicker than the ring L, so that the former may be properly compressed before the pipe ends begin to bear on the latter ring. This gasket is intended for use in a flanged socketed joint, as shown in Fig. 8, such joint consisting of a pipe M, having a socket N for the reception of the end O of the opposite pipe P, the socket and the pipe P being provided with flanges Q and R, respectively, which flanges are drawn and secured together by bolts passed therethrough. In use the gasket is placed within the socket N, and its outer ring L rests against the walls of the socket and holds the packing-ring K central on the pipe end. The packing-ring should, of course, be larger than the interior diameter of the pipe end, so that it can rest on the material of the pipe end. When the end O of the pipe P is inserted into the socket, such end bears on the packing-ring K and compresses it against the end of the pipe M, thus packing the joint. The ring L supports the packing-ring against pressure tending to distort or rupture it.

In Figs. 11 and 12 are illustrated a gasket which is the reverse of the construction shown in Figs. 8, 9, and 10. In this gasket the thin sheet-metal retaining and centering ring S is inside of the thick soft-metal packing-ring T, such gasket being adapted for use where the fluid-pressure is directed toward the center of the gasket—as, for instance, in packing a manhole-cover—it being desirable in all the forms of my gasket to have the soft metal exposed to the fluid-pressure and the holder or retaining-ring on the side of the soft-metal ring opposite to such fluid-pressure.

In Fig. 13 is shown a gasket which is substantially like the gasket shown in Figs. 11 and 12, except that the packing-ring U is, like the corresponding ring in Fig. 7, formed of a coil of soft-metal wire and that the gasket is oval in form to substantially fit a correspondingly-shaped pipe-opening.

The gasket shown in Fig. 14 consists of a soft-metal packing-ring X, formed of a coil of soft-metal wire, a thin sheet-metal ring V, secured within the ring X, and a second packing-ring W, secured within the ring V, the gasket being of oval form. Such gasket is intended for use as described in connection with the gasket shown in Figs. 8, 9, and 10 or for such use as described in connection with the gasket shown in Fig. 11.

Having thus described my invention, what I claim is—

1. A packing for steam and other joints comprising a portion of soft metal that is adapted to be compressed against the surface to be packed, and a metal holder or retaining portion of a different nature from the soft-metal portion and separate from the part to be packed, substantially as and for the purpose described.

2. A packing for steam and other joints comprising a portion of soft metal that is adapted to be compressed against the surface to be packed, and a portion of metal of different nature from the soft-metal portion and separate from the part to be packed and that sustains the soft metal against any undue pressure, substantially as and for the purpose described.

3. A packing for steam and other joints comprising a portion of soft metal that is adapted to be compressed against the surface to be packed, and a metal holder or retaining portion of a different nature from the soft-metal portion and separate from the part to be packed, the soft-metal portion being unconfined on the side which is exposed to fluid-pressure, substantially as and for the purpose described.

4. A packing for steam and other joints comprising a soft-metal packing-ring, and a metal retaining or holding ring, of a different nature from the soft-metal ring and separate from the part to be packed, substantially as and for the purpose described.

5. A packing for steam and other joints comprising a soft-metal packing-ring and a metal holder or retaining ring, of a different nature from the soft-metal ring and separate from the part to be packed, the packing-ring having greater thickness than the holder or retaining-ring, substantially as and for the purpose described.

6. A packing for steam and other joints comprising a metal inner ring and a metal outer ring, the inner ring being of soft metal and having greater thickness than the outer ring, the outer ring being of a different nature from the inner ring and separate from the part to be packed, substantially as and for the purpose described.

7. A packing for steam and other joints comprising means for packing such joint and a centering eye or eyes attached to said packing means, said eye or eyes being thinner than said packing means, substantially as and for the purpose described.

8. A packing for steam and other joints, comprising a packing-ring, a holder or retaining-ring, and centering means, said holder or retaining-ring being thinner than such packing-ring, substantially as and for the purpose described.

9. A packing for steam and other joints comprising a packing-ring, a holder or retaining-ring, and centering means, said holder or retaining-ring and said centering means being thinner than the packing-ring, substantially as and for the purpose described.

10. A packing for steam and other joints, comprising two soft-metal packing-rings, one placed within the other, and a metal holder or retaining means interposed between the packing-rings and closely encircling the inner packing-ring, substantially as and for the purpose described.

11. A packing for steam and other joints comprising two soft-metal packing-rings, one placed within the other, and a holder or retaining-ring interposed between the packing-rings, said packing-rings being thicker than the holder or retaining-ring, substantially as and for the purpose described.

12. A packing for steam and other joints, comprising two soft-metal packing-rings, one placed within the other, a holder or retaining-ring within which the inner packing-ring is received, and centering-eyes occupying the space between the holder or retaining-ring and the outer packing-ring, substantially as and for the purpose described.

In testimony that I claim the foregoing I have hereunto set my hand this 14th day of April, A. D. 1900.

CHARLES HOWARD MERWARTH.

Witnesses:
ROBT. J. OTT,
ROBERT B. OTT.